(12) United States Patent
Swenson et al.

(10) Patent No.: US 7,614,232 B2
(45) Date of Patent: Nov. 10, 2009

(54) TURBOCHARGER RECIRCULATION VALVE

(75) Inventors: Kendall Roger Swenson, Erie, PA (US);
Gregory Alan Marsh, Erie, PA (US)

(73) Assignee: General Electric Company,
Schenectady, NY (US)

( * ) Notice: Subject to any disclaimer, the term of this patent is extended or adjusted under 35 U.S.C. 154(b) by 160 days.

(21) Appl. No.: 11/102,079

(22) Filed: Apr. 9, 2005

(65) Prior Publication Data

US 2006/0016187 A1 Jan. 26, 2006

Related U.S. Application Data

(60) Provisional application No. 60/590,495, filed on Jul. 23, 2004.

(51) Int. Cl.
| F02B 33/44 | (2006.01) |
| F02B 29/04 | (2006.01) |
| F02B 37/16 | (2006.01) |
| F02B 37/00 | (2006.01) |
| F02B 37/12 | (2006.01) |

(52) U.S. Cl. .......................... 60/611; 60/599; 123/563
(58) Field of Classification Search ............... 60/611, 60/599; 123/562–563; F02B 37/16, 37/00, F02B 37/12, 33/44
See application file for complete search history.

(56) References Cited

U.S. PATENT DOCUMENTS

| 4,328,666 | A | * | 5/1982 | Cummins, Jr. ........... 60/39.093 |
| 7,108,488 | B2 | * | 9/2006 | Larue et al. ................. 60/605.1 |
| 2007/0039320 | A1 | * | 2/2007 | Gu et al. ....................... 60/599 |

FOREIGN PATENT DOCUMENTS

| JP | 2006064845 | A | * | 3/2006 |
| KR | 2006071203 | A | * | 6/2006 |

* cited by examiner

*Primary Examiner*—Thai Ba Trieu
(74) *Attorney, Agent, or Firm*—GE Global Patent Operation

(57) ABSTRACT

A system and method for maintaining an airflow path to a turbocharger system on a locomotive operating at high altitude and in a low ambient temperature environment, is provided and includes generating an ambient air stream flow into the turbocharger system to create a compressed air stream flow having a compressed air stream temperature, processing the compressed air stream to create an intercooler air stream having an intercooler air stream temperature, directing at least a portion of at least one of the compressed air stream and the intercooler air stream toward a controllable re-circulation device, operating the controllable re-circulation device to combine the at least a portion of at least one of the compressed air stream and the intercooler air stream with at least one of the compressed air stream flow and the ambient air stream.

21 Claims, 7 Drawing Sheets

TURBOCHARGER RECIRCULATION VALVE

RELATED APPLICATIONS

This application claims priority from U.S. Provisional Patent Application No. 60/590,495 filed Jul. 23, 2004, the contents of which are hereby incorporated by reference herein.

FIELD OF THE INVENTION

The present invention relates generally to an internal combustion engine for a locomotive and, more particularly, to the recirculation of air to reduce the adverse effects of ambient air temperature changes on the performance of the engine.

BACKGROUND OF THE INVENTION

Locomotives operated at high altitudes and in the far northern and southern regions of the globe are subject to severe environmental conditions which may have an adverse affect on the locomotive, including low atmospheric pressure, cold temperatures, and blowing and drifting snow.

One problem involves blockage of the filters and/or ducts. It is known that snow may be drawn into the air inlet ducts of a locomotive and may accumulate in sufficient quantities to obstruct the passage of air through the ducts. Thus, it is not uncommon for snow to accumulate on air filters disposed in the air inlet pathway of the locomotive. Such accumulations of snow may act to reduce the power output of the engine and/or may cause the engine to cease from operating completely. One way to solve this problem involves providing summer/winter doors which function to connect the air inlet duct with a source of warm air so that the cold ambient air is mixed with relatively warmer air prior to passing through the final air filters. In this case, these doors allow if the temperature of the inlet air mixture can be maintained above the freezing point, any snow /or ice that may develop or be deposited on the filters and/or ductwork will melt rather than accumulating and restricting the intake airflow. When warm air is needed to prevent the buildup of snow/ice, the summer/winter doors are opened making warm air from the engine compartment available allowing the radiant and convection heat from the engine to warm the air near the filters and/or ductwork.

Another problem involves the control of cylinder pressure to prevent the de-rating of the Gross Horse Power (GHP) on cold days. This is because relatively large compression-ignition engines, such as those used for locomotives, are usually operated at a full load with peak cylinder pressure ($P_p$), close to but not exceeding a maximum structurally allowable cylinder pressure value ($P_{max}$). As the ambient temperature drops below a nominal operating temperature (assuming ambient pressure ($P_a$) remaining unchanged), the peak cylinder pressure increases and may exceed the maximum structurally allowable cylinder pressure value. This is undesirable because it increases the engine component stress and loading.

Another problem involves the surge margin (or engine stability limit) under cold ambient conditions and a high Manifold Air Temperature (MAT). Under these conditions the engine operating point as plotted on a turbocharger compressor performance map, moves toward an area of unstable operation called the surge line. This is often made worse at high altitudes.

SUMMARY OF THE INVENTION

A locomotive turbocharger system for a locomotive engine subject to operation at high altitude and low ambient temperatures is provided and includes an air filtering device having an air filter inlet communicated with an air filter outlet via a filtering portion, the air filtering device being configured such that the filtering portion receives an ambient air stream having an ambient air stream temperature via the air filter inlet, generates a filtered air stream and discharges the filtered air stream via the air filter outlet, a compressor device having a compressor inlet communicated with a compressor outlet via a compressor portion, the compressor device being configured such that the compressor portion receives the filtered air stream via the compressor inlet, generates a compressed air stream having a compressed air stream temperature higher than the ambient air temperature and discharges the compressed air, an intercooler device having an intercooler inlet communicated with an intercooler outlet via a cooling portion, the intercooler device being configured such that the cooling portion receives compressed air stream via the intercooler inlet, generates an intercooler air stream having an intercooler air stream temperature lower than the compressed air stream temperature and discharges the intercooler air stream via the intercooler outlet wherein a first portion of at least one of the compressed air and the intercooler air is directed to the engine for use in engine combustion and a re-circulation valve in flow communication with the air filter inlet, the re-circulation valve being configured to receive a second portion of at least one of the compressed air and the intercooler air, wherein when the re-circulation valve is open for re-circulation, the re-circulation valve directs the second portion of at least one of the compressed air and the intercooler air into the ambient air stream such that the second portion of at least one of the compressed air and the intercooler air is combined with the ambient air stream to increase the temperature of the air flowing into the air filter A method for maintaining an airflow path to a turbocharger system on a locomotive operating at high altitude and in a low ambient temperature environment is provided and includes generating an ambient air stream flow into the turbocharger system to create a compressed air stream flow having a compressed air stream temperature, wherein the ambient air stream flow includes an ambient air stream flow temperature, processing the compressed air stream to create an intercooler air stream having an intercooler air stream temperature, wherein the compressed air stream temperature is greater than the intercooler air stream temperature, directing at least a portion of at least one of the compressed air stream and the intercooler air stream toward a controllable re-circulation device, wherein the controllable re-circulation device is in flow communication with at least one of the compressed air stream flow and the ambient air stream flow and operating the controllable re-circulation device to combine the at least a portion of at least one of the compressed air stream and the intercooler air stream with at least one of the compressed air stream flow and the ambient air stream flow to increase at least one of the compressed air stream temperature and the ambient air stream temperature to a predetermined level.

A method for controlling operating characteristics of a locomotive engine having a turbocharger system relative to a surge operation of the turbocharger, wherein the locomotive engine is subject to operation at high altitude and low ambient temperatures, is provided and including directing an ambient air stream flow having an ambient air stream flow temperature into the turbocharger system to create a compressed air stream flow having a compressed air stream temperature higher than the ambient air stream temperature, directing a first portion of the compressed air to an intercooler device to create an intercooler air stream having an intercooler air stream temperature lower than the compressed air stream temperature, directing a second portion of at least one of the compressed air and the intercooler air toward a controllable re-circulation valve, wherein the controllable re-circulation valve is in flow communication with at least one of the compressed air stream flow and the ambient air stream flow and opening the re-circulation valve to combine the second portion of at least one of the compressed air and the intercooler air with at least one of the compressed air stream flow and the ambient air stream flow to reduce the discharge pressure of the compressed air from the turbocharger to change the operating characteristics of the engine and turbocharger so as to avoid surge operation of the turbocharger.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1A:
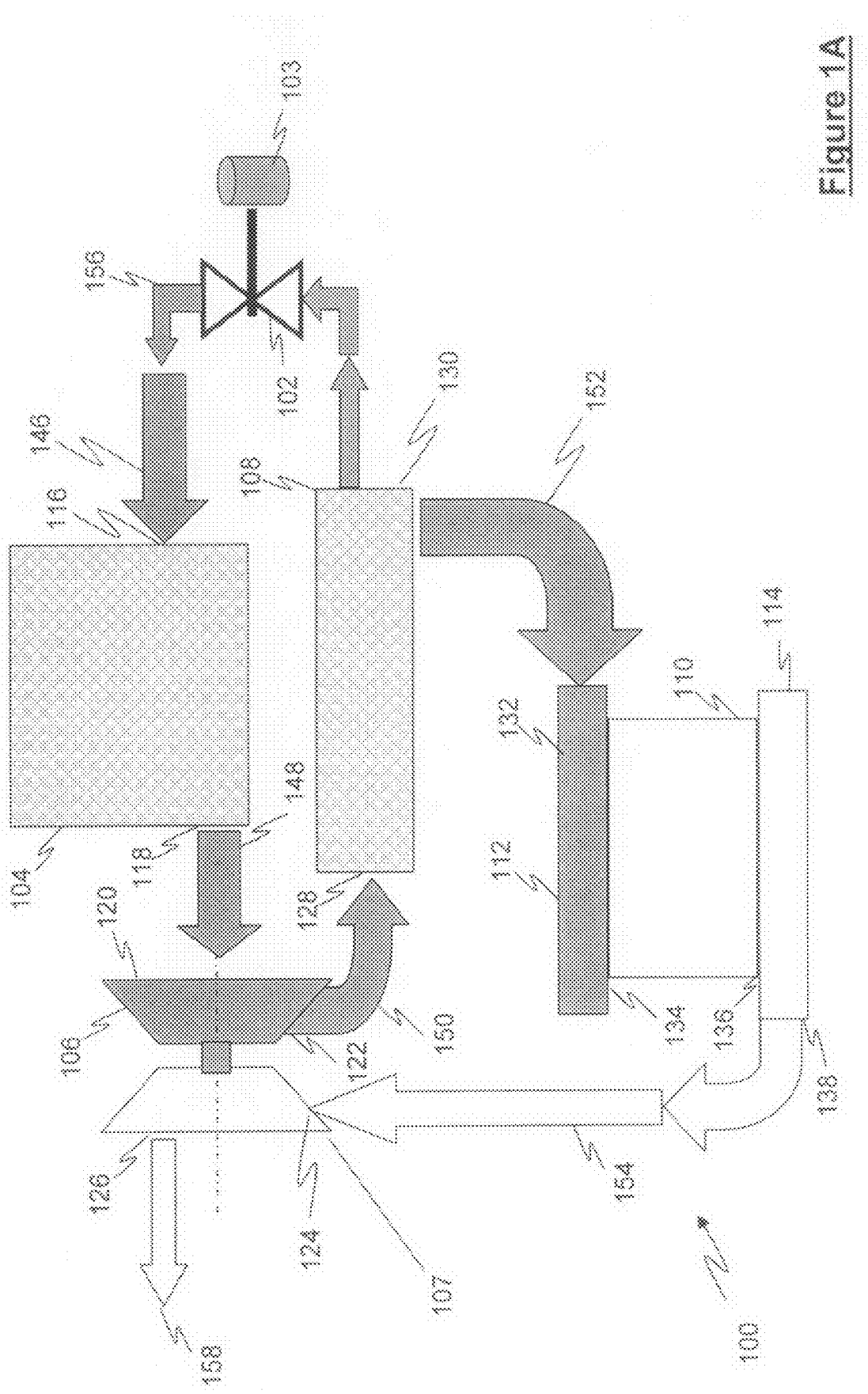
FIG. 1A is a schematic block diagram of a locomotive turbocharger system, in accordance with an exemplary embodiment.

Referring to FIG. 1A, a schematic block diagram representing a first embodiment of a locomotive turbocharger system 100 is shown and includes a turbocharger re-circulation valve 102 having a valve actuation device 103, an air filter box 104, a turbocharger compressor portion 106, a main intercooler device 108 and a locomotive engine 110, wherein locomotive engine 110 includes an intake manifold 112 and an exhaust manifold 114. Air filter box 104 includes an air inlet 116 and an air outlet 118, turbocharger compressor portion 106 includes a turbocharger compressor inlet 120, a turbocharger compressor outlet 122, a turbocharger turbine exhaust inlet 124 and a turbocharger turbine exhaust outlet 126. Main intercooler device 108 includes a main intercooler inlet 128 and a main intercooler outlet 130. Intake manifold 112 includes an intake inlet 132 and an intake outlet 134 and exhaust manifold 114 includes an exhaust inlet 136 and an exhaust outlet 138. In this embodiment, the main intercooler outlet 130 is in flow communication with the turbocharger re-circulation valve 102 to direct a cooled compressed air back into air filter box 104.

Figure 1B:
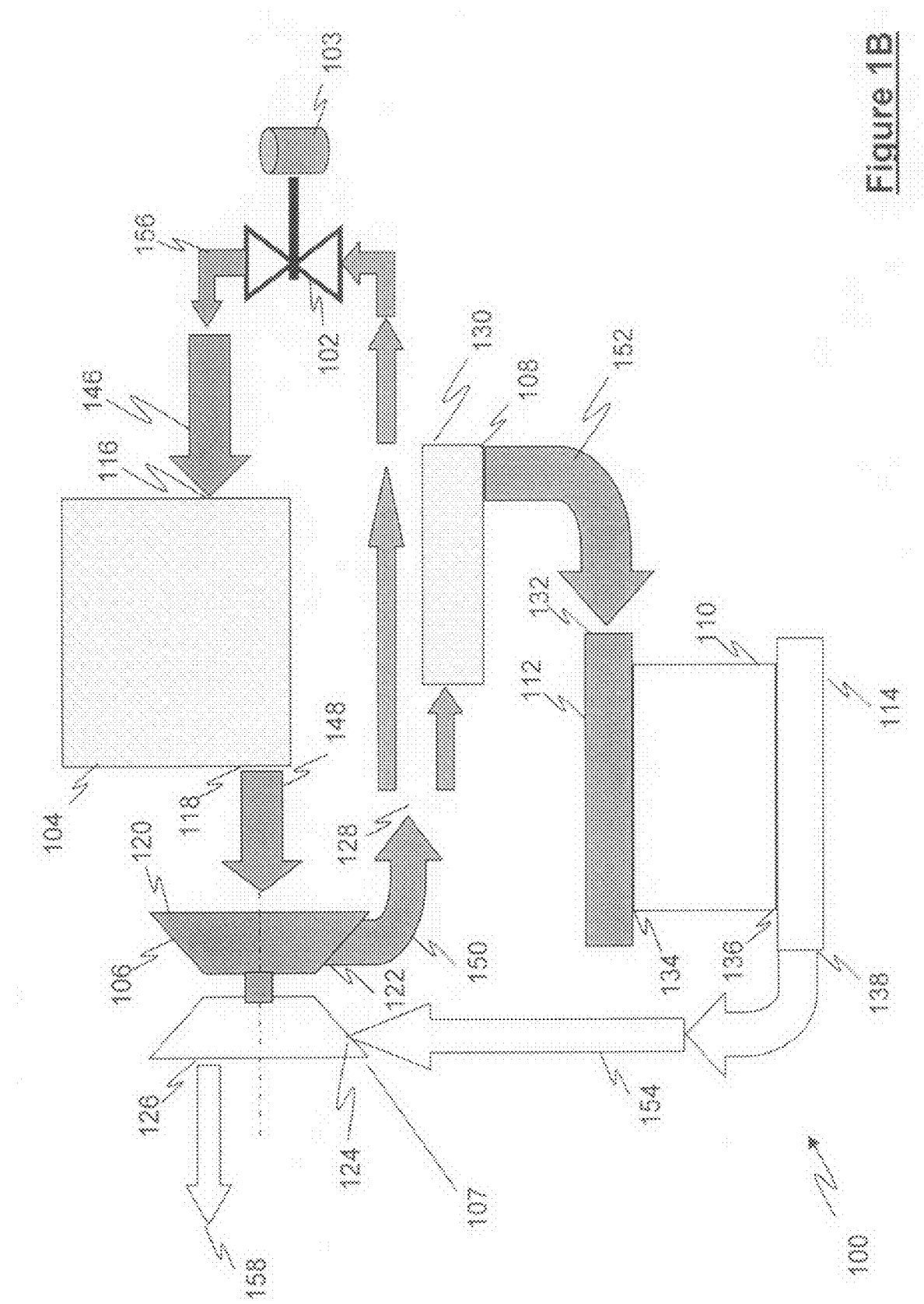
FIG. 1B is a schematic block diagram of a first alternative embodiment of the locomotive turbocharger system of FIG. 1.

Referring to FIG. 1B, a schematic block diagram representing a second embodiment of a locomotive turbocharger system 100 is shown and includes a turbocharger re-circulation valve 102 having a valve actuation device 103, an air filter box 104, a turbocharger compressor portion 106, a main intercooler device 108 and a locomotive engine 110, wherein locomotive engine 110 includes an intake manifold 112 and an exhaust manifold 114. Air filter box 104 includes an air inlet 116 and an air outlet 118, turbocharger compressor portion 106 includes a turbocharger compressor inlet 120, a turbocharger compressor outlet 122, a turbocharger turbine exhaust inlet 124 and a turbocharger turbine exhaust outlet 126. Main intercooler device 108 includes a main intercooler inlet 128 and a main intercooler outlet 130. Intake manifold 112 includes an intake inlet 132 and an intake outlet 134 and exhaust manifold 114 includes an exhaust inlet 136 and an exhaust outlet 138. In contrast to FIG. 1A, in this embodiment, the turbocharger compressor outlet 122 is in flow communication with the turbocharger re-circulation valve 102 to direct a compressed air back into air filter box 104.

Figure 2:
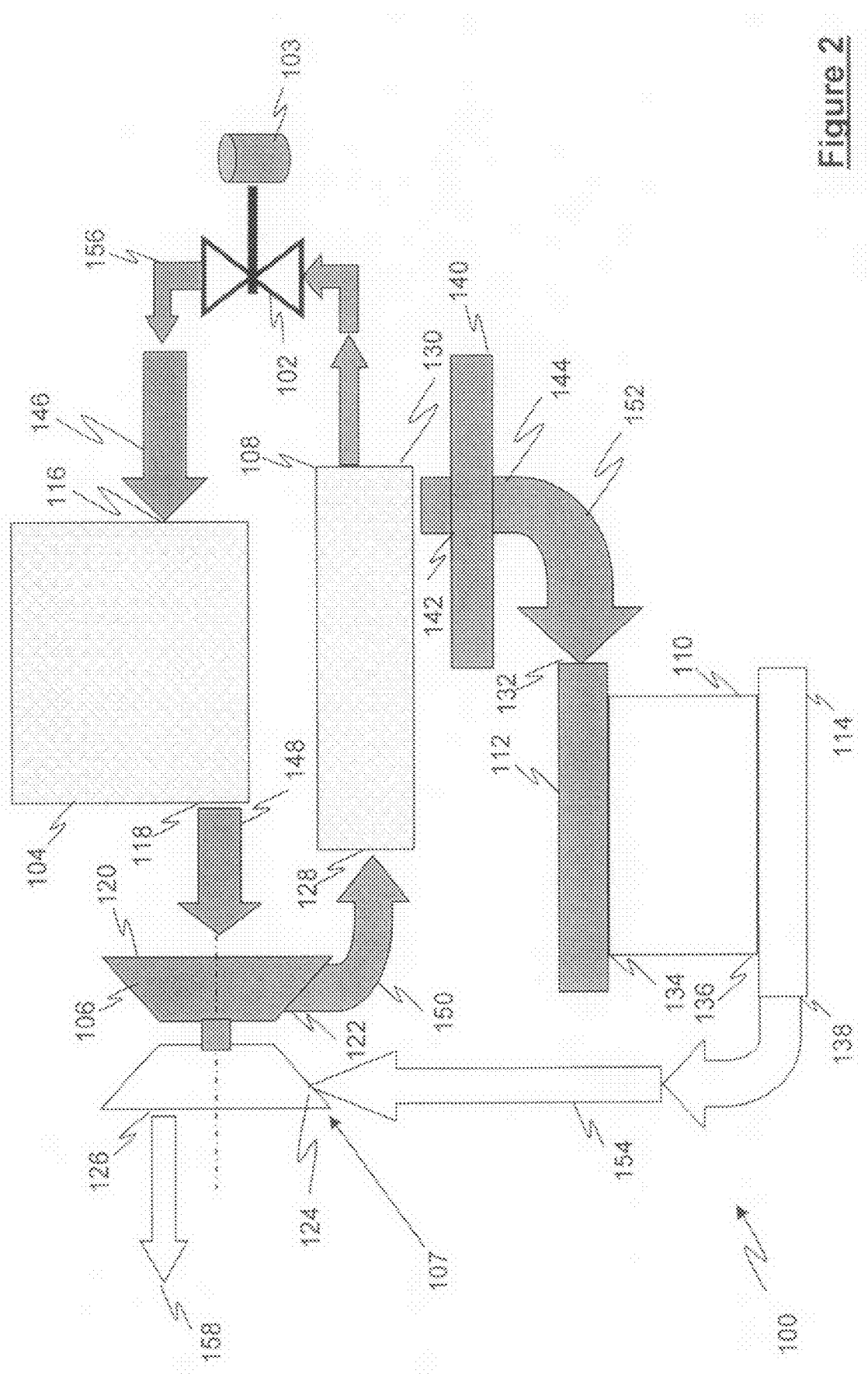
FIG. 2 is a schematic block diagram of a second alternative embodiment of the locomotive turbocharger system of FIG. 1.

It should be appreciated that, as shown in FIG. 2, an additional embodiment of locomotive turbocharger system 100 is shown and includes an optional intercooler device 140 having an optional intercooler inlet 142 and an optional intercooler outlet 144 may be included, as required. This may be utilized to satisfy new emission standards that require the air temperature of the air stream going into the intake manifold to be approximately equal to 100° Fahrenheit. It should also be appreciated that one or both of main intercooler device 108 and/or optional intercooler device 140 may be any type of intercooler device suitable to the desired end purpose, such as a water based intercooler device and/or an air to air intercooler device, and/or any combination thereof.

Referring back to FIG. 1A, locomotive turbocharger system 100 operates as follows. As the locomotive turbocharger system 100 is operated, ambient air is drawn into air filter box 104 via air inlet 116, as represented by arrow 146. Air filter box 104 filters this air and discharges the filtered air out of air outlet 118 and into turbocharger compressor portion 106 via turbocharger compressor inlet 120, as represented by arrow 148. Turbocharger compressor portion 106 compresses the filtered air and discharges the compressed air out of turbocharger compressor outlet 122 and into main intercooler device 108 via main intercooler inlet 128, as represented by arrow 150. Prior to being introduced into main intercooler device 108, the compressed air typically reaches temperatures of approximately 400° Fahrenheit. This air is cooled by main intercooler device 108 and discharged via main intercooler outlet 130. At this point, the temperature of the air stream coming out of main intercooler outlet 130 is approximately 200° Fahrenheit.

As can be seen, one portion of this discharged air stream is directed toward the locomotive engine 110 and the remaining portion of the discharged air stream is directed toward valve actuation device 103. The portion of this air stream directed toward engine 110 is directed into intake manifold 112 via intake inlet 132, as represented by arrow 152, and out of intake manifold 112 and into locomotive engine 110. As the locomotive engine 110 operates, this air stream is used to help create combustion after which the resultant is exhausted out of locomotive engine 110 and into exhaust manifold 114 via exhaust inlet 136. Exhaust manifold 114 then discharges this exhaust out of exhaust outlet 138 and into turbocharger turbine exhaust inlet 124, as represented by arrow 154. Turbocharger turbine portion 107 then discharges this exhaust via turbocharger turbine exhaust outlet 126, as represented by arrow 158.

The portion of the air stream discharged from main intercooler device 108 directed toward valve actuation device 103 is directed into the air flow of the ambient air being drawn into air filter box 104 via air inlet 116, as represented by arrow 156. This causes the cold ambient air and the redirected warmer air represented by arrow 156 to be combined, thus acting to warm the air stream flow being drawn into air filter box 104. Thus, the warmer air acts to prevent the build up of snow and/or ice that may block air inlet 116. Moreover, the opened valve acts to hold the intake manifold pressure so as to not exceed the rated cylinder pressure.

Figure 3:
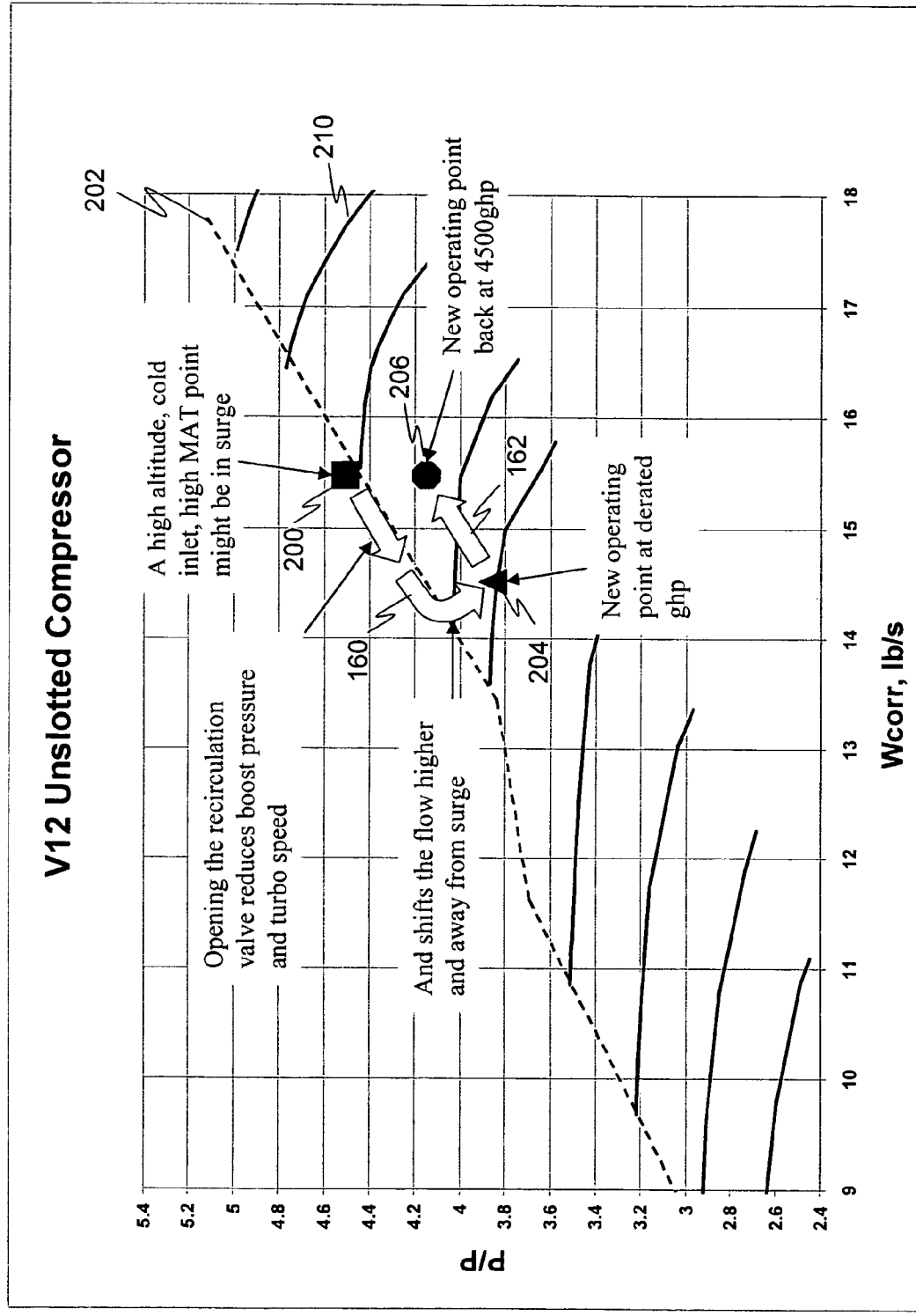
FIG. 3 is a graph representing the ideal operating characteristics of the locomotive turbocharger system of FIG. 1.

For example, referring to FIG. 3, consider an operating environment at higher altitudes where the ambient air temperature is very low. During the initial operation of the locomotive in this environment (i.e. higher altitude and cold ambient air temperature), the initial Gross Horse Power (GHP) is typically at a de-rated value and the Manifold Air Temperature (MAT) may be high. Unfortunately, these conditions are favorable for driving the operating characteristics of the locomotive close to or beyond the recommended operating parameters of the locomotive, represented in FIG. 3 as the surge line 202, possibly causing damage to the locomotive turbocharger compressor portion 106. This is because as the locomotive begins to operate in this environment, the cold ambient air is being drawn into the air inlet 116 of the air filter box 104. The air filter box 104 filters this air and discharges the filtered air out of the air outlet 118 and into the turbocharger compressor portion 106 via the turbocharger compressor inlet 120.

The turbocharger compressor portion 106 compresses the filtered air and discharges the compressed air out of the turbocharger compressor outlet 122, wherein the compressed air being discharged out of the turbocharger compressor outlet 122 typically reaches temperatures of approximately 400° Fahrenheit. As such, there is a considerable temperature differential between the inlet airflow and the outlet airflow which is a result of a compressor outlet pressure, $P_{out}$, that is considerably larger than the compressor inlet pressure, $P_{in}$. Plotting the ratio of the compressor outlet pressure, $P_{out}$, to the compressor inlet pressure, $P_{in}$, versus the corrected airflow through the turbocharger gives a graphical representation of the corrected operating characteristics of the turbocharger relative to the surge line 202, as shown in FIG. 3. Ideally, the locomotive should be operating well within the operating range identified as element 210. However, as can be seen, in the environment stated above, the turbocharger may be operating at or exceeding the design parameters of the turbocharger system 100.

To counter this, a recirculation valve is used to re-circulate a portion of at least one of the compressed air and the cooled compressed air (cooled via the intercooler device 108, although at a much higher temperature than the ambient air) back into at least one of the compressor inlet 120 and the airflow inlet 116 which increases the temperature of at least one of the airflow into the airflow inlet 116 and the airflow into the compressor inlet 120. Although increasing the temperature of the airflow into at least one of the compressor inlet 120 and the airflow inlet 116 translates into a slightly richer fuel/air mixture by introducing a slightly smaller number of air molecules into the compressor, the change in airflow through the compressor from this is relatively insignificant and does not significantly affect the turbine speed.

Opening the recirculation valve 102 results in a decrease in boost pressure and turbo speed, the main cause being that by opening the recirculation valve 102 the turbocharger back-pressure is reduced and the engine appears to the turbocharger system 100 to be a much larger engine. As such, the compressor outlet pressure, $P_{out}$, is reduced while the compressor inlet pressure, $P_{in}$, remains relatively the same, translating to a lower ratio between the compressor outlet pressure, $P_{out}$, and the compressor inlet pressure, $P_{in}$. Again, referring to FIG. 3, graphically this has the affect of 'moving' the initial operating point 200 away from the surge line 202 of the turbocharger 100 by shifting the initial operating point 200 down and to the left to an intermediate operating point 204 for the locomotive having a de-rated GHP. As the locomotive engine 110 continues to operate, the intermediate operating point 204 shifts to a final operating point 206, as represented by arrow 162, which represents the locomotive engine operating at a full GHP, but well within the surge margin operating range 210.

Figure 4:
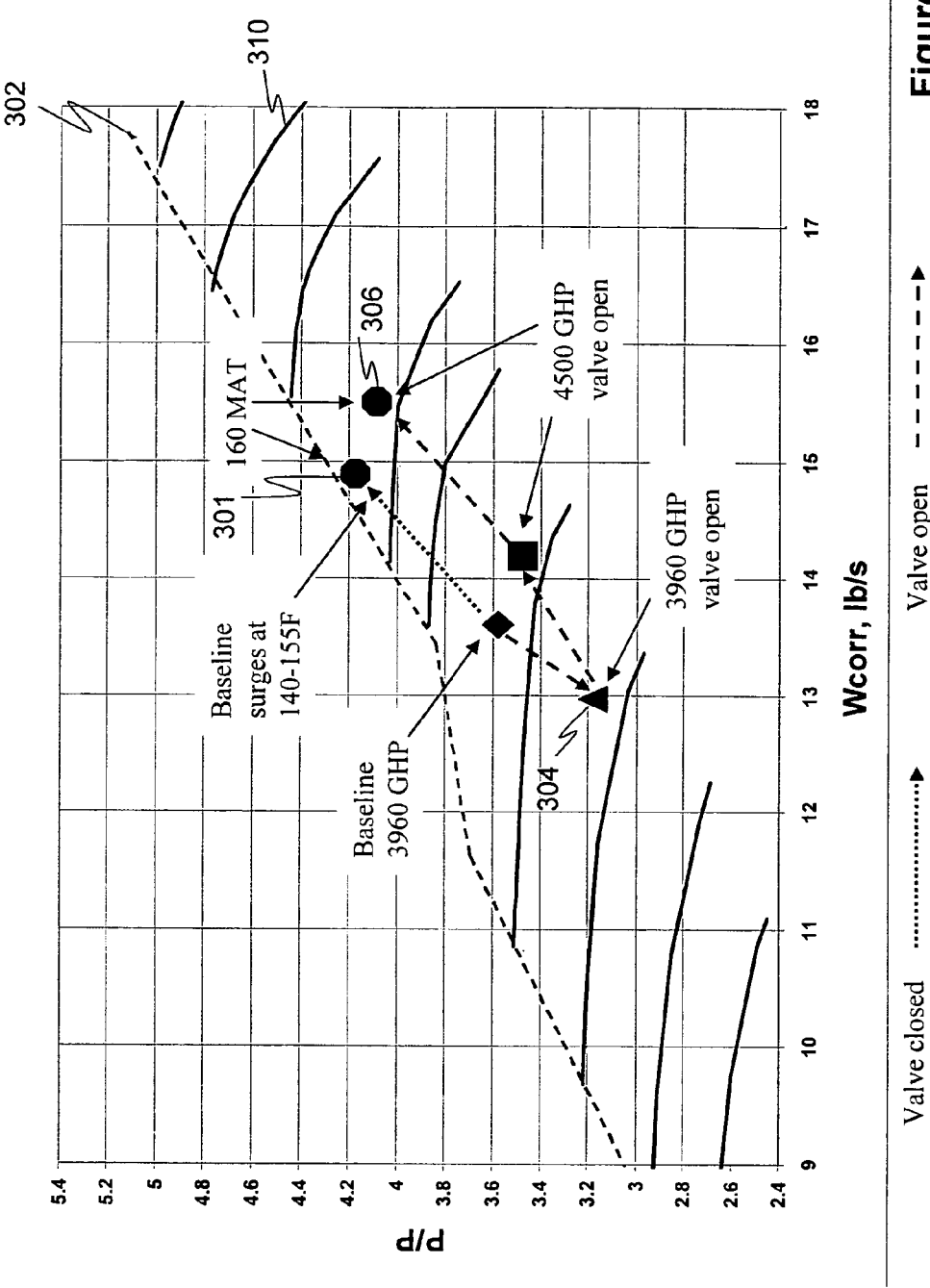
FIG. 4 is a graph representing one embodiment of operating characteristics of the locomotive turbocharger system of FIG. 1 at sea level.
Figure 5:
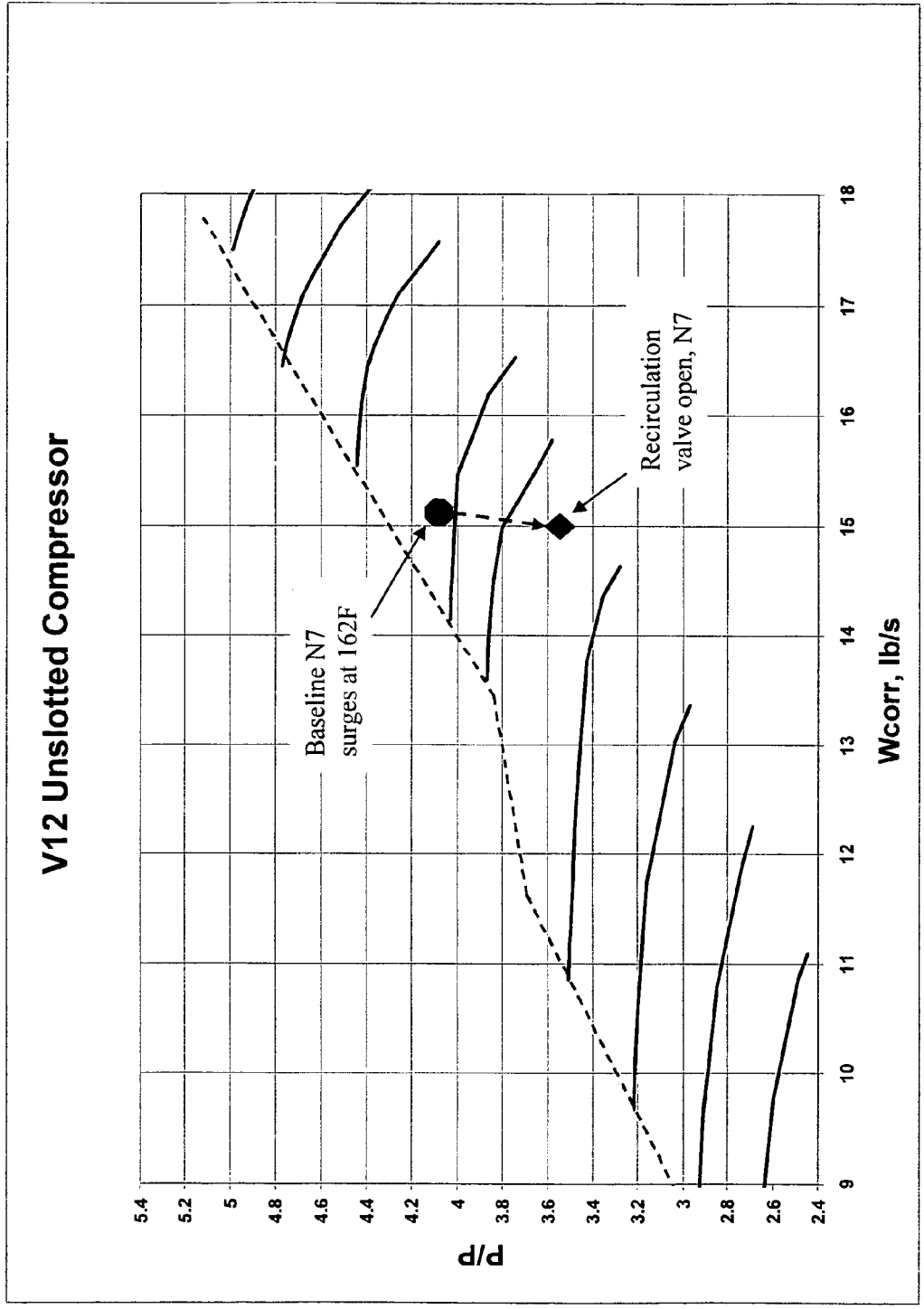
FIG. 5 is a graph representing an additional embodiment of operating characteristics of the locomotive turbocharger system of FIG. 1 at altitude.

As shown by FIGS. 4 and 5, these ideal operational characteristics were verified via multiple tests at both sea level (FIG. 4) and at a higher altitude (FIG. 5). Referring to FIG. 4, as the locomotive engine 110 was operated, the locomotive engine 110 was operating at an initial operating point 301 close to the baseline surge margin 302. As the compressed air was re-circulated back into the ambient air flow via the re-circulation valve 102 the operating characteristics shifted down and to the right of the surge margin 302 to an intermediate operating point 304. As the locomotive engine 110 continued to operate and adjust to the re-circulated flow the operating characteristics of the locomotive engine 110 began to operate at a greater efficiency as represented by the final operating point 306, well within the surge margin operating range 310.

Figure 6:
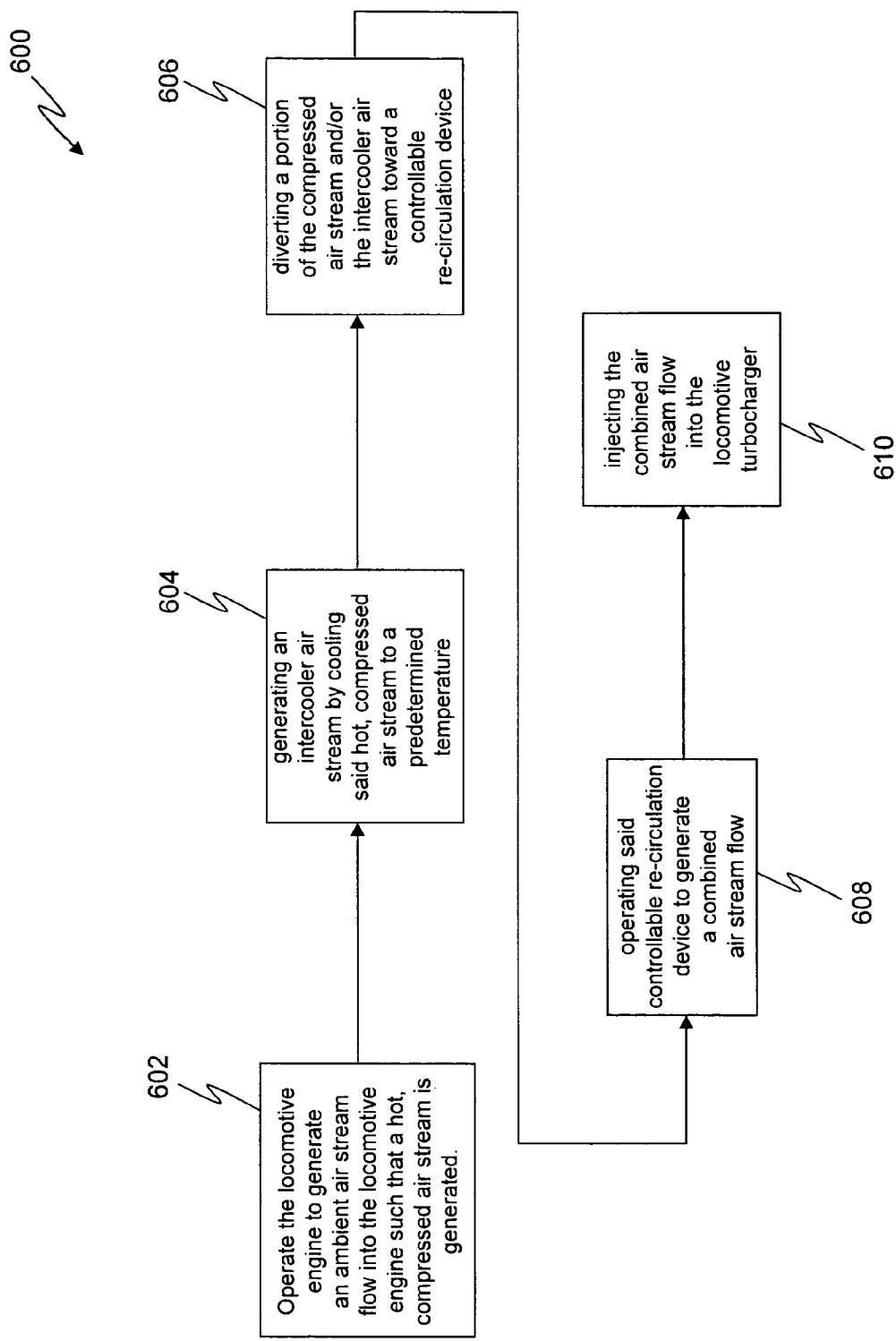
FIG. 6 is a block diagram illustrating a method for controlling the operating point of a locomotive engine operating at high altitude and in low ambient temperatures.

Referring to FIG. 6, a block diagram illustrating a method 600 for controlling the operating point of a locomotive engine 110 operating at high altitude and in low ambient temperatures is shown and includes operating the locomotive engine 110 to generate an ambient air stream flow into the locomotive engine such that a hot, compressed air stream is generated, as shown in block 602. The hot, compressed air stream is then injected into a main intercooler device 108 to generate an intercooler air stream, as shown in block 604. A portion of the intercooler air stream is then diverted toward a controllable re-circulation valve, such as turbocharger re-circulation valve 102, as shown in block 606, and the controllable re-circulation valve is operated to generate a combined air stream flow, as shown in block 608. This is accomplished by injecting the intercooler air stream into the ambient air stream flow such that the intercooler air stream and the ambient air stream combine together to create a combined air stream flow. At this point, the combined air stream flow is injected into the locomotive engine, as shown in block 610.

Valve actuation device 103 functions in a manner responsive to the ambient air conditions (such as temperature, etc.), the altitude of the locomotive and a higher horse power. It should also be appreciated that valve actuation device 103 may be controlled manually and/or via any device and/or method suitable to the desired end purpose, such as computer controlled, pneumatically controlled, mechanically controlled, electrically controlled or any combination thereof. It should be appreciated that, as shown in FIG. 2, an optional intercooler device 140 having an optional intercooler inlet 142 and an optional intercooler outlet 144 may be included, as required. This may be utilized to satisfy new emission standards that require the air temperature of the air stream going into the intake manifold to be approximately equal to 100° Fahrenheit. It should also be appreciated that one or both of main intercooler device 108 and/or optional intercooler device 140 may be any type of intercooler device suitable to the desired end purpose, such as a water based intercooler device and/or an air to air intercooler device, and/or any combination thereof.

In addition to improvements in cold ambient fuel consumption, re-circulating the air back into the air filter box also warms the baggie filters and acts to reduce ice build-up, eliminates the need to control cylinder pressure by de-rating GHP on cold days and improves surge margin under conditions of cold ambient and high MAT.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for maintaining an airflow path to a turbocharger system on a locomotive operating at high altitude and in a low ambient temperature environment, comprising:
    generating an ambient air stream flow into the locomotive turbocharger system via an air filtering device to create a compressed air stream flow having a compressed air stream temperature, wherein said ambient air stream flow includes an ambient air stream flow temperature;
    processing said compressed air stream to create an intercooler air stream having an intercooler air stream temperature, wherein said compressed air stream temperature is greater than said intercooler air stream temperature;
    directing at least a portion of at least one of said compressed air stream and said intercooler air stream toward a controllable re-circulation device, wherein said controllable re-circulation device is in flow communication with at least one of said compressed air stream flow and said ambient air stream flow; and
    operating said controllable re-circulation device to combine said at least a portion of at least one of said compressed air stream and said intercooler air stream prior to said air filtering device with at least one of said compressed air stream flow and said ambient air stream flow to increase at least one of said compressed air stream temperature and said ambient air stream temperature to a predetermined level.

2. The method of claim 1, wherein generating includes at least one of actively and passively generating said ambient air stream flow.

3. The method of claim 1, wherein said generating further includes communicating said ambient air stream flow with an air compressor device to create said compressed air stream flow.

4. The method of claim 1, wherein said processing includes communicating said compressed air stream flow to an intercooler device to create said intercooler air stream.

5. The method of claim 1, wherein said re-circulation device includes a valve actuation device, wherein said directing includes controllably directing said at least a portion of at least one of said compressor air stream and said intercooler air stream via said valve actuation device.

6. The method of claim 5, wherein said directing further includes controllably directing said at least a portion of at least one of said compressor air stream and said intercooler air stream to control at least one of the volume of said at least a portion of at least one of said compressor air stream and said intercooler air stream being directed and at least one of said compressor air stream temperature and said ambient air stream temperature.

7. A method for controlling operating characteristics of a locomotive engine having a locomotive turbocharger system relative to a surge operation of the turbocharger, wherein the locomotive engine is subject to operation at high altitude and low ambient temperatures, comprising:
    directing an ambient air stream flow having an ambient air stream flow temperature into the locomotive turbocharger system via an air filtering device to create a compressed air stream flow having a compressed air stream temperature higher than said ambient air stream temperature;
    directing a first portion of said compressed air to an intercooler device to create an intercooler air stream having an intercooler air stream temperature lower than said compressed air stream temperature;
    directing a second portion of at least one of said compressed air and said intercooler air toward a controllable re-circulation valve, wherein said controllable re-circulation valve is in flow communication with at least one of said compressed air stream flow and said ambient air stream flow; and
    opening said re-circulation valve to combine said second portion of at least one of said compressed air and said intercooler air with at least one of said compressed air stream flow and said ambient air stream flow prior to said air filtering device to reduce the discharge pressure of said compressed air from the turbocharger to change the operating characteristics of the engine and turbocharger so as to avoid surge operation of the turbocharger.

8. The method of claim 7, wherein said re-circulation valve is connected to an outlet of the turbocharger, and the method further comprises directing said second portion of the compressed air to flow from the turbocharger to the re-circulation valve.

9. The method of claim 7, wherein the re-circulation valve is connected to an outlet of the intercooler device, and the method further comprises directing said second portion of the compressed air to flow from the turbocharger to said intercooler device and then on to said re-circulation valve.

10. The method of claim 7, wherein generating includes at least one of actively and passively generating said ambient air stream flow.

11. The method of claim 10, wherein said directing further includes controllably directing said at least a portion of said intercooler air stream to control at least one of the volume of said at least a portion of said intercooler air stream being directed, said ambient air stream temperature, said compressed air stream temperature and said operating characteristics of the engine.

12. The method of claim 7, wherein said generating further includes communicating said ambient air stream flow with an air compressor device to create said compressed air stream flow.

13. The method of claim 7, wherein said processing includes communicating said compressed air stream flow to an intercooler device to create said intercooler air stream.

14. The method of claim 7, wherein said re-circulation device includes a valve actuation device, wherein said directing includes controllably directing said at least a portion of said intercooler air stream via said valve actuation device.

15. A locomotive turbocharger system for a locomotive engine subject to operation at high altitude and low ambient temperatures, comprising:

an air filtering device having an air filter inlet communicated with an air filter outlet via a filtering portion, said air filtering device being configured such that said filtering portion receives an ambient air stream having an ambient air stream temperature via said air filter inlet, generates a filtered air stream and discharges said filtered air stream via said air filter outlet;

a compressor device having a compressor inlet communicated with a compressor outlet via a compressor portion, said compressor device being configured such that said compressor portion receives said filtered air stream via said compressor inlet, generates a compressed air stream having a compressed air stream temperature higher than said ambient air temperature and discharges said compressed air;

an intercooler device having an intercooler inlet communicated with an intercooler outlet via a cooling portion, said intercooler device being configured such that said cooling portion receives compressed air stream via said intercooler inlet, generates an intercooler air stream having an intercooler air stream temperature lower than the compressed air stream temperature and discharges said intercooler air stream via said intercooler outlet wherein a first portion of at least one of said compressed air and said intercooler air is directed to the engine for use in engine combustion; and a re-circulation valve in flow communication with said air filter inlet, said re-circulation valve being configured to receive a second portion of at least one of said compressed air and said intercooler air, wherein when said re-circulation valve is open for re-circulation, said re-circulation valve directs said second portion of at least one of said compressed air and said intercooler air into said ambient air stream such that said second portion of at least one of said compressed air and said intercooler air is combined with said ambient air stream prior to said air filtering device to increase the temperature of the air flowing into said air filter.

16. The locomotive turbocharger system of claim 15, wherein said re-circulation valve is connected to an outlet of said compressor device, and said second portion of compressed air flows from said compressor device to said re-circulation valve.

17. The locomotive turbocharger system of claim 15, wherein said re-circulation valve is connected to an outlet of said intercooler device, and said second portion of compressed air flows from said compressor device to said intercooler device and then on to said re-circulation valve.

18. The locomotive turbocharger system of claim 15, further comprising an additional intercooler device configured to receive said first portion of compressed air, wherein said additional intercooler device processes said first portion of compressed air stream to generate an engine intake air stream having an engine intake air stream temperature.

19. The locomotive turbocharger system of claim 18, wherein said engine intake air stream is in flow communication with said engine via an intake manifold and wherein said engine intake air stream temperature is controlled via said additional intercooler device.

20. The locomotive turbocharger system of claim 18, wherein said intercooler device and said additional intercooler device is at least one of a water based intercooler device, an air to air intercooler device and a combination of said water based intercooler device and said air to air intercooler device.

21. The locomotive turbocharger system of claim 15, further comprising a valve actuation device for said re-circulation valve to selectively control the flow rate of said second portion of compressed air such that said second portion of compressed air is combined within at least one of said filtered air stream and said ambient air stream as a controlled mass of air.

* * * * *